Patented May 19, 1925.

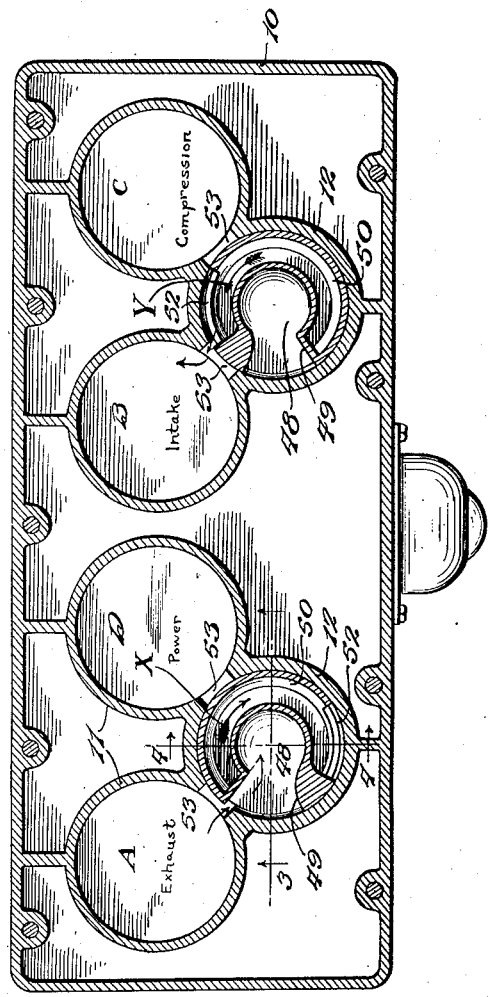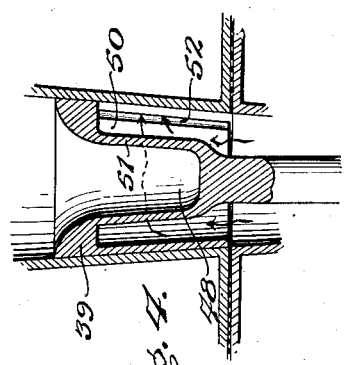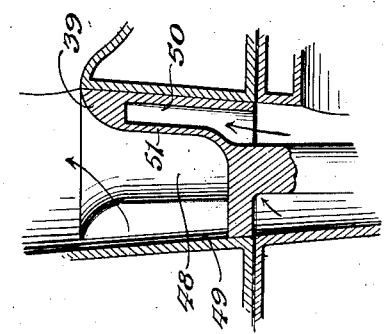

1,538,313

UNITED STATES PATENT OFFICE.

ALBERT J. BODKER, OF PONCHATOULA, LOUISIANA.

DOUBLE-ACTING ROTARY VALVE FOR INTERNAL-COMBUSTION ENGINES.

Application filed May 1, 1924. Serial No. 710,350.

*To all whom it may concern:*

Be it known that I, ALBERT J. BODKER, a citizen of the United States, residing at Ponchatoula, in the parish of Tangipahoa and State of Louisiana, have invented certain new and useful Improvements in Double-Acting Rotary Valves for Internal-Combustion Engines, of which the following is a specification.

The present invention relates to valves for internal combustion engines for controlling both the fuel intake and exhaust. These valves are rotary valves and each is intended to serve two working cylinders. In this manner, for a four cylinder engine only two valves are required and these two valves regulating both the intake and exhaust of the respective pair of cylinders.

The two valves are arranged to turn in opposite directions so that the four cylinders will be operated in the order of 1, 3, 4, 2.

In the accompanying drawings, one embodiment of the invention is illustrated, and:

Figure 2 is a horizontal sectional view on the line 2—2 of Figure 1.

Figure 3 is a fragmentary section along line 3—3 of Figure 2, and

Figure 4 is a similar section along line 4—4 of Figure 2.

Figure 1:
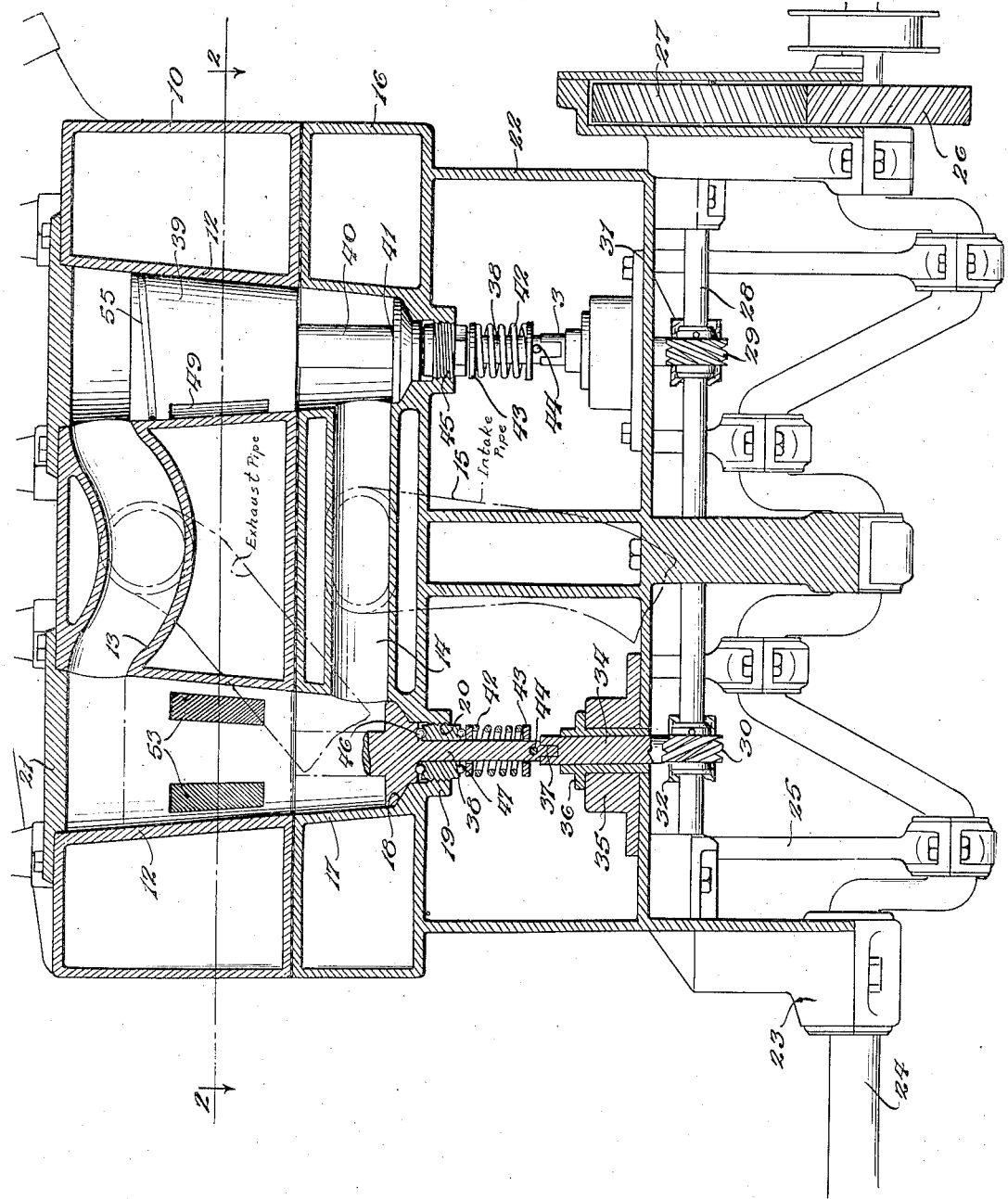
Figure 1 is a vertical section through the valve cages and crank box of an internal combustion engine.

In the drawings, the reference numeral 10 represents a casing containing four working cylinders 11 and the reference numeral 12 the valve cages. The working cylinders are arranged in the same vertical plane and the valve cages in another vertical plane parallel to the first, the cages being so arranged that one cage is situated between the two cylinders which it is to serve.

The valve cages are preferably tapering downwardly, as best seen in Figure 1, and are open at their upper ends to communicate with an exhaust passage 13 leading to the exhaust manifold, while the lower end of each valve cage connects with an inlet passage 14 communicating with a fuel supply 15. For the sake of facilitating manufacture, the intake passage 14 is contained in a box 16 rigidly secured to the casing 10 and the tapering side walls of the cages 12 are continued, as at 17, downwardly in said box. In axial alinement with each valve cage is formed a seat 18 at the lower end of the box, which seat terminates with a boss 19 provided with internal threads 20. The upper end of the valve cage 12 is closed by means of a cover plate 21.

The box 16 forms a part of the crank case 22 which extends below the box and has suitable bearings 23 for the crank shaft 24. This crank shaft carries the usual pitmen 25 for the pistons operating in the working cylinders 11 and said pitmen are arranged in the usual manner. The crank shaft 24 is provided with a gear wheel 26 in mesh with another gear wheel 27 of the same size mounted on the gear shaft 28. The shafts 24 and 28 will accordingly rotate at the same speed. On the gear shaft are carried two worms 29 and 30, one being left hand and the other right hand and these worms mesh respectively with worm gears 31 and 32, the ratio between the worms and worm gears being as 2 to 1 or, in other words, the stub shafts 33 and 34 upon which the worm gears are mounted make one revolution to two revolutions of the gear shaft 28.

The stub shafts 33 and 34 are mounted in suitable bearings 35 preferably provided with bushings 36, as best seen in Figure 1. In the upper end of each stub shaft is a transverse slot 37. In this slot the lower end of a valve spindle 38 is adapted to engage so that the valve body will be turned by the stub shaft 34. The valve body 39, which has the form of an inverted conic frustum, is integral with the valve spindle 38 and is carried on an extension 40 of said spindle, so that the lower end of the valve body 39 does not extend below the lower side of the valve cage 12. On the spindle extension 40 is formed a collar 41, the under side of which is tapering to correspond with the seat 18 near the bottom of the box 16. Around the spindle 38 is carried a compression spring 42 between two washers 43, the lower one of which rests upon the pin 44 engaging in the spindle 38. The valve is retained in the cage by means of a threaded plug 45 engaging the internal threads 20 in the boss 19, already described, and between the plug 45 and the tapering collar 41 is furnished a ball bearing 46, a second ball bearing 47 being inserted between the lower end of the plug 45 and the upper washer 43.

The valve body 39 has a central axial passage 48 registering with the exhaust passage 13 in the casing and connecting with the exhaust port 49 in the side of the valve body. An annular passage 50 is formed outside of this central passage and divided from the same by a thin wall 51, as best seen in Figures 3 and 4. This annular passage opens downwardly and registers with a corresponding opening in the box 16 which communicates with the intake passage 14 therein. This annular passage communicates with a second or intake port 52 in the side of the valve body. Each of the cylinders is provided with a port 53 which serves both as intake and exhaust port for the cylinder and which is arranged in such a manner that the ports 49 and 50 in the valve body will alternately register with the corresponding cylinder port 53.

It will now be evident that with the right hand valve positioned as indicated in Figure 2 of the drawings, fresh fuel will proceed from the intake passage 14 upwardly through the annular passage 50 in the valve body and through the intake port 52 into the port 53 of the working cylinder indicated by the reference character B in said figure. At the same time, the left hand valve, positioned as seen in the same figure, will permit exhaust to take place from the working cylinder denoted by the reference character A, through the port 53 in said cylinder, the exhaust port 49 in said valve body, and the central passage 48 leading out to the exhaust passage 13 in the casing.

The engine is arranged as a four-stroke cycle engine and, as indicated in Figure 2, the valve bodies 39, which are right and left hand as previously indicated, turn in opposite directions, as indicated by the arrows X and Y in said figure. During the exhaust stroke of cylinder A when the valve 39 is in the position indicated in this figure, the cylinder D receives its power stroke while cylinder B has its intake stroke and cylinder C its compression stroke. Accordingly, the cylinders operate in the order of A, B, C, D.

The valves are lubricated by an oil system feeding the valves from the outside of the motor, the oil entering near the top of the valve bodies and being taken by a helical groove 55 near the upper end of each valve body, as best seen in Figure 1. This groove is so arranged that the oil will be compelled to travel downwardly on the inner walls of the valve cage but the groove preferably does not extend below the upper ends of the side ports in the valve bodies.

This double-acting rotary valve has several advantages in its use on internal combustion engines. Considering for instance, a four cylinder engine of this class, each cylinder is generally equipped with two pop valves, one for fuel intake and one for exhaust, making eight of these valves in all.

A four cylinder engine, on the other hand, equipped with valves forming the subject matter of the present invention, need only one valve for each pair of cylinders or four in all. This makes a great saving of both material and labor in the construction of an engine, not to mention the reduction in the number of parts and ease of assembling and operation, all tending to reduce the cost of manufacture.

As the valve is made to rotate in its conical seat no carbon can be deposited therein and as a consequence, no leakage or defective operation will be possible. Even if the valve should not fit exactly in the seat from the beginning, it will soon grind itself into correct position so that, instead of deteriorating from long use, it will improve in time if it had ever been defective. This fact tends to eliminate repairs and reduce the cost of upkeep.

As distinguished from pop valves, this valve is not dependent on springs for closing. The synchronizing and correct opening and closing of the intake and exhaust ports will accordingly be more positive.

Last but not least, the arrangement of an annular intake passage for fuel surrounding the axial exhaust passage in the valve insures the pre-heating of the fresh fuel by the exhaust fluid. The valve is thus kept at an even temperature and the fresh fuel is made to enter the combustion chamber of the working cylinder in a most favorable condition, thus facilitating the ignition.

Having thus described the invention, what I claim is:

1. A double-acting rotary valve for internal combustion engines comprising a valve cage in the engine, one end of said valve cage having an opening connected with a fuel supply and the other end having an opening connected with an exhaust for spent fluid, a port being provided in the side of the cage opening into the working cylinder of the engine, a valve body revolubly mounted in said cage, the valve body having side ports adapted to register alternately with the cage port, the valve body having passages separated from each other, one of the passages registering with the exhaust opening and being connected with one of said side ports, the other of the passages registering with the fuel supply opening and being connected with the other of the side ports, a spindle extending downwardly from the valve body, and an adjusting plug around the spindle having threaded engagement with the cage.

2. A double-acting rotary valve for internal combustion engines comprising a valve cage in the engine, one end of said valve cage having an opening connected with a fuel supply and the other end having an opening connected with an exhaust for spent fluid, a port being provided in the side of the cage opening into the working cylinder of the engine, a valve body revolubly mounted in said cage, the valve body having side ports adapted to register alternately with the cage port, the valve body having passages separated from each other, one of the passages registering with the exhaust opening and being connected with one of said side ports, the other of the passages registering with the fuel supply opening and being connected with the other of the side ports, a spindle extending downwardly from the valve body, an adjusting plug around the spindle having threaded engagement with the cage, a washer secured to the free end of the spindle, and a compression spring inserted between the washer and the adjacent plug.

3. The combination with an internal combustion engine having a plurality of pairs of working cylinders, of a double-acting rotary valve for each pair of cylinders, an open-ended valve cage for each of said valves, each of the cylinders having a side port opening into the respective valve cage, one of the end openings being connected with a fuel supply and the other end opening forming an exhaust, said rotary valve comprising a valve body revolubly mounted in its valve cage, an exhaust port and an intake port being provided through the side of said valve body, the exhaust port being situated in advance of the intake port, said valve ports being adapted to register alternately first with one and then with the other of the corresponding working cylinder ports, the valve body having passages, one of the passages being adapted to connect said exhaust port with the exhaust opening of the cage, the other of the passages being adapted to connect the intake port with the fuel supply opening, a spindle extending downwardly from the valve body, an adjusting plug around the spindle having threaded engagement with the cage, a washer secured to the free end of the spindle, a compression spring inserted between the washer and the adjusting plug, and means for revolving each valve body in opposite direction to the adjacent valve body.

4. A double acting rotary valve for internal combustion engines, comprising a valve cage in the engine, one end of said valve cage having an opening connected with a fuel supply and the other end having an opening connected with an exhaust for spent fluid, a port being provided in the side of said cage opening into the working cylinder of the engine, a valve body revolubly mounted in said cage, said valve body having side ports adapted to register alternately with said cage port, the valve body having an annular passage and an axial passage separated from each other, said axial passage registering with the exhaust opening and being connected with one of said side ports, said annular passage registering with said fuel supply opening and being connected with the other of said side ports, suitable gearing connection between the crank shaft of the engine and said valve body adapted to revolve the valve body at a ratio of 1 to 2 between the valve body and the crank shaft, said valve body having the shape of an inverted conic frustum, a spindle extending downwardly from said valve body and provided with a tapering collar adapted to fit in a corresponding seat furnished in said cage, an adjusting plug around said spindle and having threaded engagement with said cage, a washer secured to the free end of said spindle, and a compression spring inserted between said washer and said adjusting plug.

In testimony whereof I affix my signature.

ALBERT J. BODKER.